US009384760B2

(12) United States Patent
Nakadai et al.

(10) Patent No.: US 9,384,760 B2

(45) Date of Patent: Jul. 5, 2016

(54) SOUND PROCESSING DEVICE AND SOUND PROCESSING METHOD

(71) Applicant: HONDA MOTOR CO., LTD., Tokyo (JP)

(72) Inventors: Kazuhiro Nakadai, Wako (JP); Keisuke Nakamura, Wako (JP); Tatsuya Higuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 14/155,446

(22) Filed: Jan. 15, 2014

(65) Prior Publication Data

US 2014/0214418 A1 Jul. 31, 2014

(30) Foreign Application Priority Data

Jan. 28, 2013 (JP) ................................ 2013-013251

(51) Int. Cl.

*G10L 15/20* (2006.01)
*G10L 25/78* (2013.01)
*G10L 21/0216* (2013.01)

(52) U.S. Cl.

CPC ............. *G10L 25/78* (2013.01); *G10L 21/0216* (2013.01)

(58) Field of Classification Search

None

See application file for complete search history.

(56) References Cited

U.S. PATENT DOCUMENTS

| | | | | |
|---|---|---|---|---|
| 6,678,656 | B2 * | 1/2004 | Macho et al. | 704/233 |
| 7,617,099 | B2 * | 11/2009 | Yang | H04R 3/005 704/228 |
| 8,737,641 | B2 * | 5/2014 | Tasaki | G10L 21/0208 381/317 |
| 2012/0221330 | A1 * | 8/2012 | Thambiratnam et al. | 704/235 |
| 2013/0051570 | A1 * | 2/2013 | Unno et al. | 381/56 |
| 2013/0132076 | A1 * | 5/2013 | Yang et al. | 704/219 |
| 2014/0012573 | A1 * | 1/2014 | Hung | G06F 1/3215 704/233 |

FOREIGN PATENT DOCUMENTS

| | | | |
|---|---|---|---|
| JP | 2012-042953 | A | 3/2012 |
| JP | 2012-234150 | A | 11/2012 |

* cited by examiner

*Primary Examiner* — Benny Q Tieu

*Assistant Examiner* — Sunil Chacko

(74) *Attorney, Agent, or Firm* — Squire Patton Boggs (US) LLP

(57) ABSTRACT

A sound processing device includes a first noise suppression unit configured to suppress a noise component included in an input sound signal using a first suppression amount, a second noise suppression unit configured to suppress the noise component included in the input sound signal using a second suppression amount greater than the first suppression amount, a speech section detection unit configured to detect whether the sound signal whose noise component has been suppressed by the second noise suppression unit includes a speech section having a speech for every predetermined time, and a speech recognition unit configured to perform a speech recognizing process on a section, which is detected to be a speech section by the speech section detection unit, in the sound signal whose noise component has been suppressed by the first noise suppression unit.

4 Claims, 10 Drawing Sheets

SOUND PROCESSING DEVICE AND SOUND PROCESSING METHOD

CROSS REFERENCE TO RELATED APPLICATIONS

Priority is claimed on Japanese Patent Application No. 2013-013251, filed on Jan. 28, 2013, the contents of which are entirely incorporated herein by reference.

BACKGROUND OF THE INVENTION

1. Field of the Invention

The present invention relates to a sound processing device and a sound processing method.

2. Description of Related Art

It is known that a speech recognition rate is lowered when speech is recognized in a noisy environment. Therefore, it has been proposed that sound signals of multiple channels are recorded, a speech and noise included in the recorded sound signals are separated from each other, and the speech separated from the noise is recognized. A sound source separating technique of estimating directions of sound sources and separating sound signals for the sound sources using directional filters having high sensitivity in the estimated directions is known as the process of separating sound sources.

For example, in a sound signal processing device disclosed in Japanese Unexamined Patent Application, First Publication No. 2012-234150, a direction and a section of a target sound are estimated based on sound signals of multiple channels acquired from multiple microphones disposed at different positions and a sound signal of a predetermined target sound is extracted from the estimated direction and section. Specifically, observation signals in the time and frequency domains are generated from the sound signals of multiple channels, and a direction of a target sound and a section in which the target sound appears are detected based on the observation signals. A reference signal corresponding to a time envelope indicating a sound volume variation in the time direction of the target sound is generated based on the detected direction and section of the target sound, a covariance matrix is calculated from the reference signal and the observation signals, and an extraction filter for extracting a sound signal of the target sound is generated from eigenvectors of the calculated covariance matrix.

However, in the sound signal processing device disclosed in Japanese Unexamined Patent Application, First Publication No. 2012-234150, since the sound source directions of the sound signals of multiple channels are estimated regardless of the number of sound sources uttering sound and sound signals of the sound sources are separated from the sound signals of multiple channels, the calculation cost is very high and the processing time is long. The number of sound sources simultaneously uttering sound may vary and thus the estimation accuracy of the sound source directions is lowered. In addition, since the degree of separation of the sound sources is not perfect, a speech recognition rate is lowered.

SUMMARY OF THE INVENTION

The present invention was made in consideration of the above-mentioned situations and an object thereof is to provide a sound processing device and a sound processing method which can cause reduction of a calculation cost and enhancement of a speech recognition rate to be compatible with each other.

(1) In order to achieve the above-mentioned object, according to an aspect of the invention, there is provided a sound processing device including: a first noise suppression unit configured to suppress a noise component included in an input sound signal with a first suppression amount; a second noise suppression unit configured to suppress the noise component included in the input sound signal with a second suppression amount greater than the first suppression amount; a speech section detection unit configured to detect whether the sound signal whose noise component has been suppressed by the second noise suppression unit includes a speech section having a speech for every predetermined time; and a speech recognition unit configured to perform a speech recognizing process on a section, which is detected to be a speech section by the speech section detection unit, in the sound signal whose noise component has been suppressed by the first noise suppression unit.

(2) The sound processing device according to another aspect of the invention may further include a sound signal input unit configured to input sound signals of at least two channels, one of the first noise suppression unit and the second noise suppression unit may be configured to suppress the noise component of the at least two channels, the speech section detection unit may be configured to detect whether the sound signal of the maximum intensity channel, which is a channel in which the intensity of the sound signal whose noise component has been suppressed by the one noise suppression unit is the larger out of the at least two channels includes a speech section, and the speech recognition unit may be configured to perform a speech recognizing process on the section, which is detected to be a speech section by the speech section detection unit, in the sound signal of the maximum intensity channel whose noise component has been suppressed by the first noise suppression unit.

(3) The sound processing device according to another aspect of the invention may further include: a sound signal input unit configured to input sound signals of at least two channels; a sound source estimation unit configured to estimate the number of sound sources of the sound signals of the at least two channels input by the sound signal input unit and directions of the sound sources; and a sound source separation unit configured to separate the sound signals of the at least two channels into sound signals of the sound sources based on the directions of the sound sources when the number of sound sources estimated by the sound source estimation unit is at least two, and the speech recognition unit may be configured to perform the speech recognizing process on the sound signals of the sound sources separated by the sound source separation unit.

(4) In the sound processing device according to another aspect of the invention, the speech section detection unit may be configured to calculate the intensity and the zero-crossing number of the sound signal whose noise component has been suppressed by the second noise suppression unit and to detect whether the sound signal includes a speech section based on the calculated intensity and the calculated zero-crossing number.

(5) According to still another aspect of the invention, there is provided a sound processing method including: a first noise suppression step of suppressing a noise component included in an input sound signal using a first suppression amount; a second noise suppression step of suppressing the noise component included in the input sound signal using a second suppression amount greater than the first suppression amount; a speech section detecting step of detecting whether the sound signal whose noise component has been suppressed in the second noise suppression step includes a speech section having a speech for every predetermined time; and a speech recognizing step of performing a speech recognizing process on a section, which is detected to be a speech section in the speech section detecting step, in the sound signal whose noise component has been suppressed in the first noise suppression step.

According to the aspects of (1) and (5), it is possible to correctly determine a speech section based on a noise-removed signal whose noise component has been suppressed using the larger second suppression amount and it is possible to improve a speech recognition rate using a sound signal with reduced distortion whose noise component has been suppressed using the smaller first suppression amount.

According to the aspect of (2), since the speech section detecting process or the speech recognizing process is performed on the channel including a speech component having the largest intensity, it is possible to further reduce the influence of the noise component and thus to improve the speech recognition rate.

According to the aspect of (3), when sounds are less often uttered simultaneously from multiple sound sources, the opportunity to perform a process with a large processing load such as a process of separating sound signals of the sound sources is restricted. Accordingly, it is possible to improve the speech recognition rate in recognizing speeches from multiple sound sources and to reduce the processing load of a system as a whole.

According to the aspect of (4), since the intensity for each frame and the zero-crossing number are used as a key to accurately distinguish a speech and a non-speech, it is possible to accurately determine whether a frame is a speech section to be recognized and thus to improve the speech recognition rate.

DETAILED DESCRIPTION OF THE INVENTION

First Embodiment

Hereinafter, a first embodiment of the invention will be described with reference to the accompanying drawings.

Figure 1:
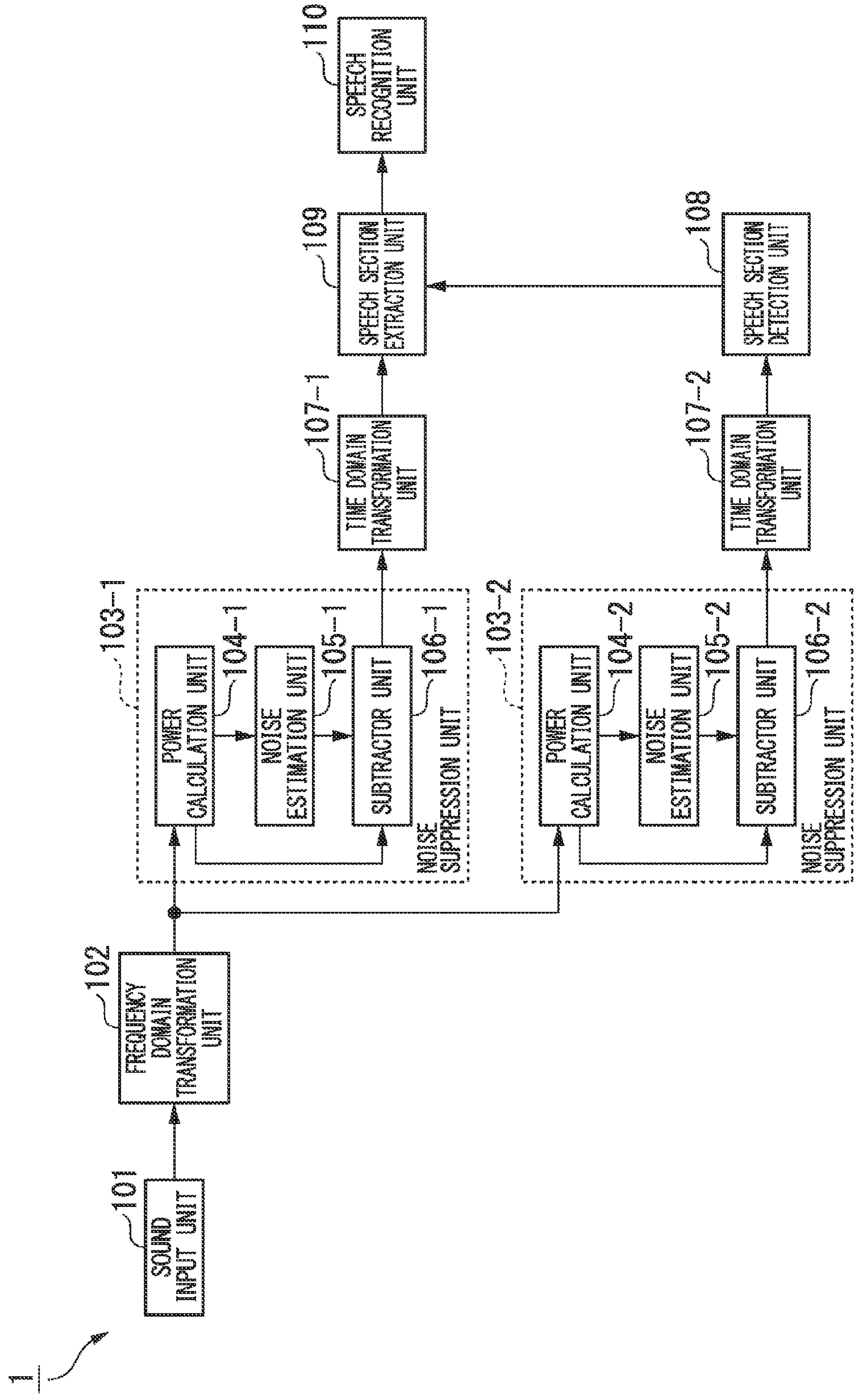
FIG. 1 is a block diagram schematically illustrating a configuration of a sound processing device according to a first embodiment of the invention.

FIG. 1 is a block diagram schematically illustrating a configuration of a sound processing device 1 according to the first embodiment of the invention.

The sound processing device 1 includes a sound input unit 101, a frequency domain transformation unit 102, two noise suppression units 103-1 and 103-2, two time domain transformation units 107-1 and 107-2, a speech section detection unit 108, a speech section extraction unit 109, and a speech recognition unit 110.

In the sound processing device 1, the noise suppression unit 103-1 reduces a noise component included in an input sound signal using a first suppression amount and the noise suppression unit 103-2 reduces the noise component included in the input sound signal using a second suppression amount greater than the first suppression amount. In the sound processing device 1, the speech section detection unit 108 detects whether the sound signal whose noise component has been suppressed by the noise suppression unit 103-2 includes a speech section including a speech for each predetermined time. In the sound processing device 1, the speech recognition unit 110 performs a speech recognizing process on a section which is detected to be a speech section by the speech section detection unit 108 out of the sound signal whose noise component has been suppressed by the noise suppression unit 103-1.

The sound input unit 101 generates a sound signal y(t) which is an electrical signal based on an arriving sound wave and outputs the generated sound signal y(t) to the frequency domain transformation unit 102. Here, t represents a time. The sound input unit 101 is, for example, a microphone that records a sound signal of an audible band (20 Hz to 20 kHz).

The frequency domain transformation unit 102 transforms the sound signal y(t), which is input from the sound input unit 101 and expressed in the time domain, to a complex input spectrum Y(k, l) expressed in the frequency domain. Here, k is an index indicating a frequency and l represents an index indicating a frame. Here, the frequency domain transformation unit 102 performs a discrete Fourier transform (DFT) on the sound signal y(t), for example, for each frame l. The frequency domain transformation unit 102 may multiply the sound signal y(t) by a window function (for example, Hamming window) and may transform the sound signal multiplied by the window function to the complex input spectrum Y(k, l) expressed in the frequency domain.

The frequency domain transformation unit 102 outputs the transformed complex input spectrum Y(k, l) to the two noise suppression units 103-1 and 103-2.

The two noise suppression units 103-1 and 103-2 estimate a noise component of the complex input spectrum Y(k, l) input from the frequency domain transformation unit 102 and calculate a spectrum (complex noise-removed spectrum) X'(k, l) of the sound signal whose estimated noise component has been suppressed. The two noise suppression units 103-1 and 103-2 have the same configuration as long as not mentioned differently. The description of the noise suppression unit 103-2 is the same as the noise suppression unit 103-1. Here, the suppression amount (second suppression amount) by which the noise suppression unit 103-2 reduces a noise component is larger than the suppression amount (first suppression amount) by which the noise suppression unit 103-1 reduces a noise component.

The noise suppression unit 103-1 includes a power calculation unit 104-1, a noise estimation unit 105-1, and a subtractor unit 106-1. The noise suppression unit 103-2 includes a power calculation unit 104-2, a noise estimation unit 105-2, and a subtractor unit 106-2. The power calculation unit 104-2, the noise estimation unit 105-2, and the subtractor unit 106-2 have the same configurations as the power calculation unit 104-1, the noise estimation unit 105-1, and the subtractor unit 106-1, respectively. The noise suppression unit 103-2 will be described mainly centered on differences from the noise suppression unit 103-1.

The power calculation unit 104-1 calculates a power spectrum $|Y(k, l)|^2$ based on the complex input spectrum Y(k, l) input from the frequency domain transformation unit 102. In the following description, the power spectrum may be simply referred to as a power. Here, |CN| represents the absolute value of a complex number CN. The power calculation unit 104-1 outputs the calculated power spectrum $|Y(k, l)|^2$ to the noise estimation unit 105-1 and the subtractor unit 106-1.

Similarly to the power calculation unit 104-1, the power calculation unit 104-2 outputs a power spectrum $|Y(k, l)|^2$ calculated based on the complex input spectrum Y(k, l) to the noise estimation unit 105-2 and the subtractor unit 106-2.

The noise estimation unit 105-1 calculates a power spectrum λ(k, l) of the noise component included in the power spectrum $|Y(k, l)|^2$ input from the power calculation unit 104-1. In the following description, the noise power spectrum λ(k, l) may be simply referred to as a noise power λ(k, l).

Similarly to the noise estimation unit 105-1, the noise estimation unit 105-2 calculates a noise power λ(k, l) based on the power spectrum $|Y(k, l)|^2$ input from the power calculation unit 104-2.

Here, the noise estimation units 105-1 and 105-2 calculate the noise power λ(k, l), for example, using a histogram-based recursive level estimation (HRLE) method. In the HRLE method, a histogram (frequency distribution) of the power spectrum $|Y(k, l)|^2$ in a logarithmic domain is calculated and the noise power λ(k, l) is calculated based on the cumulative distribution thereof and a predetermined cumulative frequency Lx. The process of calculating the noise power λ(k, l) using the HRLE method will be described later. The cumulative frequency Lx is a parameter for determining the noise power of background noise included in a recorded sound signal, that is, a control parameter for controlling a suppression amount of the noise component which is subtracted (suppressed) by the subtractor units 106-1 and 106-2.

The larger the cumulative frequency Lx is, the larger the suppression amount is. The smaller the cumulative frequency Lx is, the smaller the suppression amount is. When the cumulative frequency Lx is 0, the suppression amount is also 0.

When the noise estimation unit 105-2 employs the HRLE method, a cumulative frequency Lx (for example, 0.92) greater than the cumulative frequency Lx (for example, 0.3) used in the noise estimation unit 105-1 is used. Accordingly, the suppression amount of the noise component in the noise estimation unit 105-2 is greater than the suppression amount of the noise component in the noise estimation unit 105-1.

The noise estimation units 105-1 and 105-2 may calculate the noise power λ(k, l) using another method such as a minima-controlled recursive average (MCRA) method, instead of the HRLE method. When the MCRA method is used, a set of a mixing ratio $\alpha_d$ of the estimated stationary noise and a coefficient r used to estimate a stationary noise may be used instead of the cumulative frequency Lx as a control parameter for controlling the suppression amount of noise introduced in the MCRA method.

The noise estimation units 105-1 and 105-2 output the calculated noise powers λ(k, l) to the subtractor units 106-1 and 106-2.

The subtractor unit 106-1 calculates a spectrum of a sound signal whose noise component has been removed (complex noise-removed spectrum) by subtracting the noise power λ(k, l) from the power spectrum $|Y(k, l)|^2$ input from the power calculation unit 104-1 or performing a calculation operation corresponding to the subtraction.

Here, the subtractor unit 106-1 calculates a gain $G_{SS}(k, l)$, for example, using Expression (1), based on the power spectrum $|Y(k, l)|^2$ input from the power calculation unit 104-1 and the noise power λ(k, l) input from the noise estimation unit 105-1.

$$G_{SS}(k,l)=\max[\sqrt{\{|Y(k,l)|^2-\lambda(k,l)\}/|Y(k,l)|^2},\beta] \tag{1}$$

In Expression (1), max(α, β) represents a function of providing the larger number of real numbers α and β. Here, β is a minimum value of a predetermined gain $G_{SS}(k, l)$. Here, the left side (the real number a side) of the function max represents a square root of a ratio of the power spectrum $|Y(k, l)|^2-\lambda(k, l)$ in which the noise component associated with a frequency k in a frame l is removed to the power spectrum $|Y(k, l)|^2$ in which the noise is not removed.

The subtractor unit 106-1 calculates the complex noise-removed spectrum X'(k, l) by multiplying the complex input spectrum Y(k, l) input from the frequency domain transformation unit 102 by the calculated gain $G_{SS}(k, l)$. That is, the complex noise-removed spectrum X'(k, l) is a complex spectrum in which the noise power representing the noise component is subtracted (suppressed) from the complex input spectrum Y(k, l). The subtractor unit 106-1 outputs the calculated complex noise-removed spectrum X'(k, l) to the time domain transformation unit 107-1.

Similarly to the subtractor unit 106-1, the subtractor unit 106-2 calculates the complex noise-removed spectrum X"(k, l) based on the power spectrum $|Y(k, l)|^2$ input from the power calculation unit 104-2 and the noise power λ(k, l) input from the noise estimation unit 105-1. The subtractor unit 106-2 outputs the calculated complex noise-removed spectrum X"(k, l) to the time domain transformation unit 107-2.

The time domain transformation unit 107-1 transforms the complex noise-removed spectrum X'(k, l) input from the subtractor unit 106-1 into a first noise-removed signal x'(t) in the time domain. Here, the time domain transformation unit 107-1 performs, for example, an inverse discrete Fourier transform (IDFT) on the complex noise-removed spectrum X'(k, l) for each frame l and calculates the first noise-removed signal x'(t). The time domain transformation unit 107-1 outputs the transformed first noise-removed signal x'(t) to the speech section extraction unit 109. The first noise-removed signal x'(t) is a sound signal which is obtained by reducing the estimated noise component from the sound signal y(t) using a predetermined suppression amount (first suppression amount) by the use of the noise suppression unit 103-1.

By performing the same processes as in the time domain transformation unit 107-1, the time domain transformation unit 107-2 transforms the complex noise-removed spectrum X"(k, l) input from the subtractor unit 106-2 into a second noise-removed signal x"(t) in the time domain. Here, the time domain transformation unit 107-2 outputs the transformed second noise-removed signal x"(t) to the speech section detection unit 108. The second noise-removed signal x"(t) is a sound signal which is obtained by reducing the estimated noise component from the sound signal y(t) using a second suppression amount greater than the first suppression amount by the use of the noise suppression unit 103-2.

The speech section detection unit 108 detects whether the second noise-removed signal x"(t) input from the time domain transformation unit 107-2 includes a speech section including speech uttered by a person. The process of detecting a speech section is referred to as voice activity detection (VAD).

First, the speech section detection unit 108 determines whether each frame of the second noise-removed signal x"(t) is in a sounding section or in a soundless section. The speech section detection unit 108 determines that a frame is in a sounding section, for example, when intensity of a signal value constituting the frame is greater than a predetermined threshold value of intensity. The speech section detection unit 108 determines that a frame is in a soundless section when the intensity of the frame is equal to or less than a predetermined threshold value of intensity. An example of determination on whether a frame is in a sounding section will be described later.

The speech section detection unit 108 determines whether the frame determined to be in a sounding section is in a speech section. An example of the process of determining whether a frame is in a speech section will be described later.

The speech section detection unit 108 generates speech section detection information indicating whether a frame is in a speech section or in a non-speech section for each frame and outputs the generated speech section detection information to the speech section extraction unit 109. For example, the speech section detection information may be binary information having a value of 1 when the speech section detection information indicates that a frame is in a speech section and having a value of 0 when the speech section detection information indicates that a frame is in a non-speech section.

The speech section extraction unit 109 extracts a signal of a frame in which the speech section detection information input from the speech section detection unit 108 indicates that the frame is in a speech section as a speech section signal z(t) from the first noise-removed signal x'(t) input from the time domain transformation unit 107-1. The speech section extraction unit 109 outputs the extracted speech section signal z(t) to the speech recognition unit 110. Accordingly, it is possible to prevent erroneous recognition due to performing of a speech recognizing process on a sound signal in a non-speech section.

The speech recognition unit 110 performs a speech recognizing process on the speech section signal z(t) input from the speech section extraction unit 109 and recognizes speech details such as phoneme sequences or words. For example, the speech recognition unit 110 includes a hidden Markov model (HMM) which is an acoustic model and a word dictionary. The speech recognition unit 110 calculates sound feature amounts of the auxiliary noise-added signal x(t), for example, static mel-scale log spectrums (MSLS), delta MSLS, and one delta power, for every predetermined time. The speech recognition unit 110 determines phonemes from the calculated sound feature amount using the acoustic model and recognizes words from the phoneme sequence including the determined phonemes using the word dictionary.

A noise estimating process of causing the noise estimation units 105-1 and 105-2 to calculate a noise power X(k, l) using the HRLE method will be described below.

The HRLE method is a method of counting a frequency for each power to generate a histogram at a certain frequency, calculating a cumulative frequency by accumulating the frequency counted using the generated histogram for the power, and determining a power, to which a predetermined cumulative frequency Lx is given, as a noise power. Therefore, the larger the cumulative frequency Lx is, the larger the estimated noise power is. The smaller the cumulative frequency Lx is, the smaller the estimated noise power is.

Figure 2:
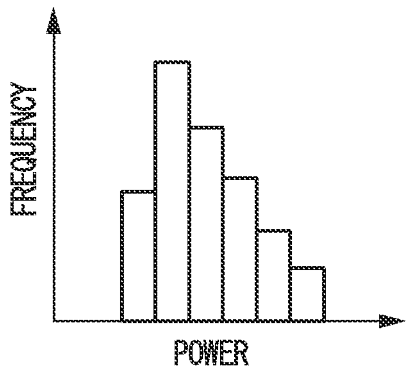
FIG. 2 is a conceptual diagram illustrating an example of a histogram.

FIG. 2 is a conceptual diagram illustrating an example of a histogram.

In FIG. 2, the horizontal axis represents the power and the vertical axis represents the frequency. FIG. 2 illustrates the frequency for each section of a power. The frequency is the number of times in which a calculated power (spectrum) is determined to belong to a certain power section for each frame in a predetermined time and is also called appearance frequency. In the example illustrated in FIG. 2, the frequency in the second power section from the leftmost is the highest. This power section may also be referred to as a class in the following description.

Figure 3:
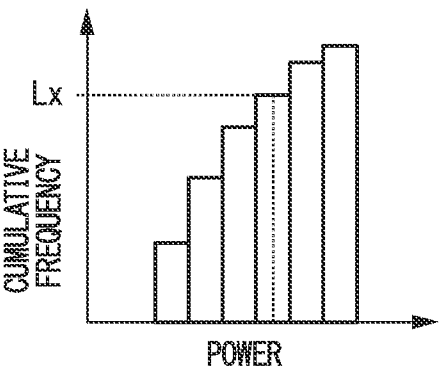
FIG. 3 is a conceptual diagram illustrating an example of a cumulative distribution.

FIG. 3 is a conceptual diagram illustrating an example of a cumulative distribution.

In FIG. 3, the horizontal axis represents the power and the vertical axis represents the cumulative frequency. The cumulative frequency illustrated in FIG. 3 is a value obtained by sequentially accumulating the frequency illustrated in FIG. 2 from the leftmost section for each power section. The cumulative frequency is also referred to as a cumulative appearance frequency. Lx indicates the cumulative frequency used to calculate the noise power using the HRLE method. In the example illustrated in FIG. 3, the power corresponding to the cumulative frequency Lx is a power corresponding to the fourth power section from the leftmost. In the HRLE method, this power is determined to be a noise power.

A specific noise estimating process flow based on the HRLE method will be described below.

Figure 4:
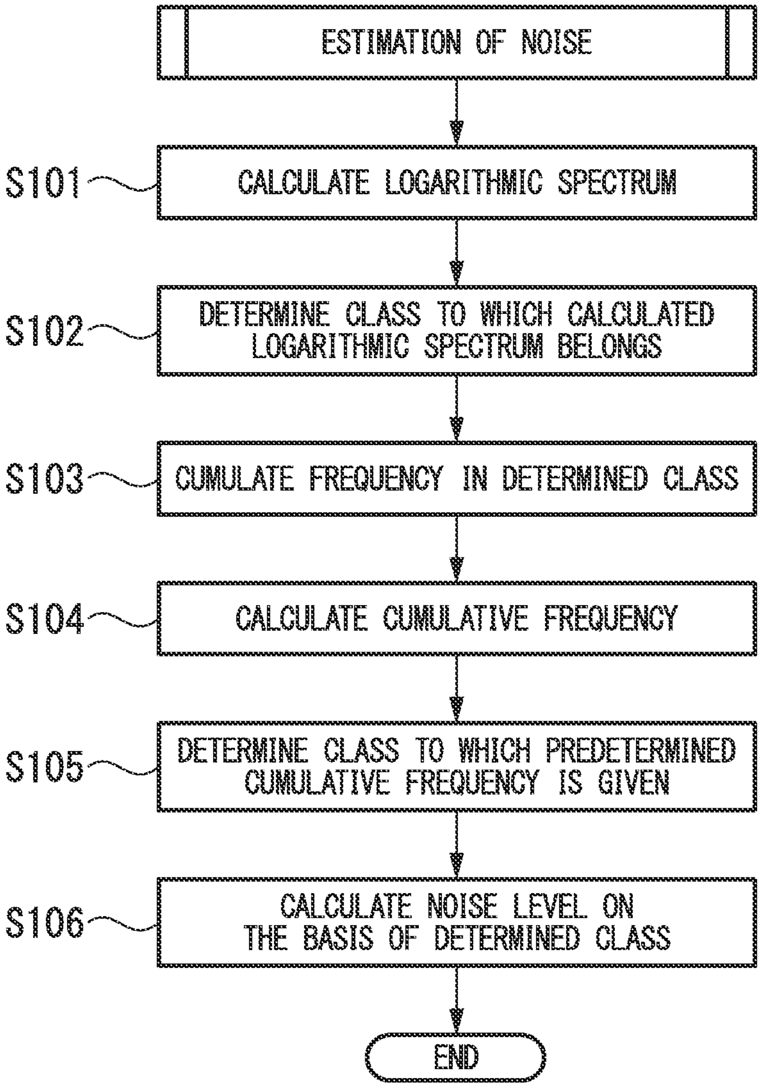
FIG. 4 is a flowchart illustrating a noise estimating process flow according to the first embodiment.

FIG. 4 is a flowchart illustrating a noise estimating process flow according to this embodiment.

(Step S101) The noise estimation units 105-1 and 105-2 calculate a logarithmic spectrum $Y_L(k, l)$ based on the power spectrum $|Y(k, l)|^2$. Here, $Y_L(k, l)$ is expressed by Expression (2).

$$Y_L(k,l)=20\log_{10}|Y(k,l)| \qquad (2)$$

Thereafter, the process proceeds to step S102.

(Step S102) The noise estimation units 105-1 and 105-2 determine a class $I_y(k, l)$ to which the calculated logarithmic spectrum $Y_L(k, l)$ belongs. Here, $I_y(k, l)$ is expressed by Expression (3).

$$I_y(k,l)=\mathrm{floor}(Y_L(k,l)-L_{min})/L_{step} \qquad (3)$$

In Expression (3), floor(A) is a floor function that provides a real number A or a maximum integer smaller than A. $L_{min}$ and $L_{step}$ represent a predetermined minimum level of the logarithmic spectrum $Y_L(k, l)$ and a level width of each class.

Thereafter, the process proceeds to step S103.

(Step S103) The noise estimation units 105-1 and 105-2 accumulate the appearance frequency N(k, l, i) of the class i in the current frame l, for example, using Expression (4).

$$N(k,l,i)=\alpha\cdot N(k,l-1,i)+(1-\alpha)\cdot\delta(i-I_y(k,l)) \qquad (4)$$

In Expression (4), $\alpha$ represents a time decay parameter. $\alpha=1-1/(T_r\cdot F_s)$ is established. $T_r$ represents a predetermined time constant. $F_s$ represents a sampling frequency. $\delta(X)$ represents a Dirac's delta function. That is, the appearance frequency N(k, l, i) is obtained by adding $1-\alpha$ to a value damped by multiplying the appearance frequency N(k, l−1, i) of the class $I_y(k, l)$ in the previous frame l−1 by $\alpha$. Accordingly, the appearance frequency $N(k, l, I_y(k, l))$ of the class $I_y(k, l)$ is accumulated.

Thereafter, the process proceeds to step S104.

(Step S104) The noise estimation units 105-1 and 105-2 calculate a cumulative appearance frequency S(k, l, i) by adding the appearance frequencies N(k, l, i') from the lowest class 0 to the class i. Thereafter, the process proceeds to step S105.

(Step S105) The noise estimation units 105-1 and 105-2 determine as an estimated class $I_x(k, l)$ a class i for giving a cumulative appearance frequency S(k, l, i) most approximate to the cumulative appearance frequency $S(k, l, I_{max})\cdot Lx$ corresponding to the cumulative frequency Lx. That is, the estimated class $I_x(k, l)$ has the relationship expressed by Expression (5) with the cumulative appearance frequency S(k, l, i).

$$I_x(k,l)=\arg\min_i[S(k,l,I_{max})\cdot Lx-S(k,l,i)] \quad (5)$$

In Expression (5), $\arg\min_i[C]$ represents a function of giving i minimizing C.

Thereafter, the process proceeds to step S106.

(Step S106) The noise estimation units 105-1 and 105-2 convert the estimated class $I_x(k, l)$ into a logarithmic level $\lambda_{HRLE}(k, l)$. Here, $\lambda_{HRLE}(k, l)$ is calculated, for example, using Expression (6).

$$\lambda_{HRLE}(k,l)=L_{min}+L_{step}\cdot I_x(k,l) \quad (6)$$

The logarithmic level $\lambda_{HRLE}(k, l)$ is converted into a linear domain and the noise power λ(k, l) is calculated. λ(k, l) is calculated, for example, using Expression (7).

$$\lambda(k,l)=10^{(\lambda_{HRLE}(k,l)/20)} \quad (7)$$

Thereafter, the process flow ends.

An effect of the noise suppression will be described below.

Figure 5:
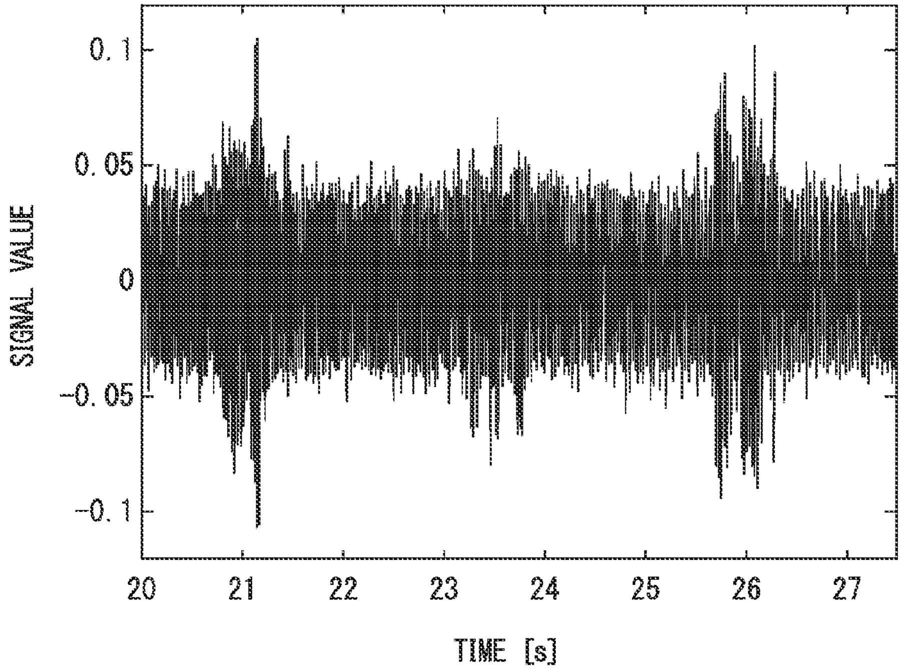
FIG. 5 is a diagram illustrating an example of an input signal.

FIG. 5 is a diagram illustrating an example of an input signal y(t).

In FIG. 5, the horizontal axis represents the time and the vertical axis represents a signal value of the input signal y(t). In FIG. 5, since background noise is superimposed, the average of the absolute values of the signal values over the entire range is about 0.03, which is significantly greater than zero. Therefore, sounds equivalent to or smaller than this signal value are not detected.

Figure 6:
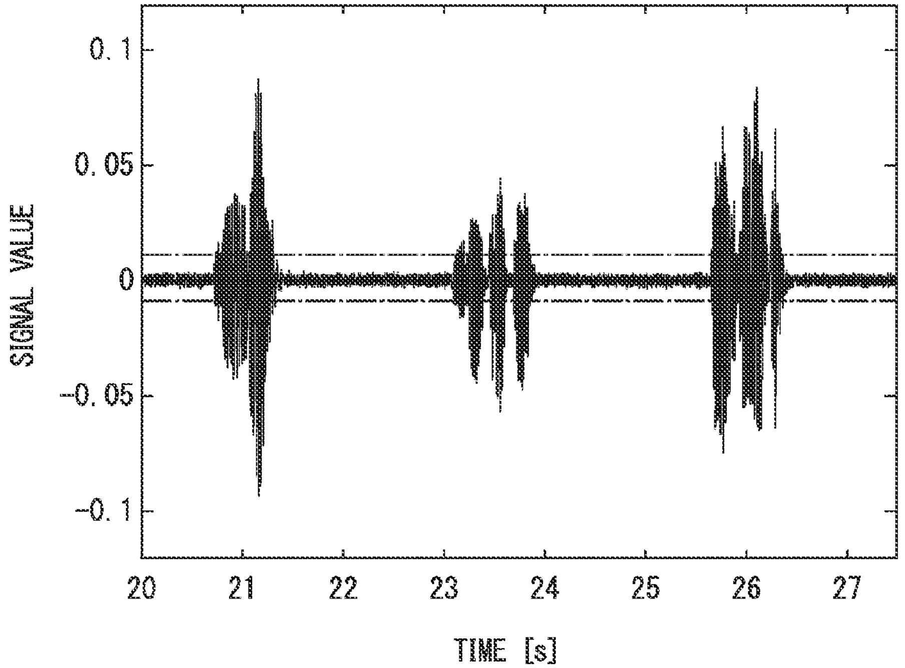
FIG. 6 is a diagram illustrating an example of a second noise-removed signal.

FIG. 6 is a diagram illustrating an example of the second noise-removed signal x"(t).

In FIG. 6, the horizontal axis represents the time and the vertical axis represents the signal value of the second noise-removed signal x"(t). The average of the absolute values of the signal values of the second noise-removed signal x"(t) is about 0.002, for example, in time sections of 20.0 to 20.7 sec, 21.3 to 23.0 sec, 24.0 to 25.7 sec, and 26.4 to 27.4 sec. Since this value is markedly smaller than about 0.03 in the input signal y(t), it means that the background noise is suppressed from the input signal y(t). In the second noise-removed signal x"(t), two one-dot chained lines extending in the left-right direction represent threshold values used for the speech section detection unit 108 to determine whether a frame is in a sounding section. In this example, the threshold values represent that the absolute values of the signal values (amplitudes) are 0.01. Here, the speech section detection unit 108 uses the average value in a frame of the absolute values of the signal values as the intensity, determines that the frame is in a sounding section when the intensity thereof is greater than the threshold value, and determines that the frame is in a soundless section when the intensity thereof is equal to or less than the threshold value. The speech section detection unit 108 may use power which is the total sum in a frame of square values of the signal values as the intensity.

Here, waveforms of sound signals based on speeches uttered in the time sections of 20.7 to 21.3 sec, 23.0 to 24.0 sec, and 25.7 to 26.4 sec are clearly illustrated. These sections are determined to be a sounding section.

An example of a process flow of causing the speech section detection unit 108 to determine whether a frame is in a speech section will be described below.

For example, the speech section detection unit 108 counts the number of zero crossings in a frame determined to be in a sounding section. The number of zero crossings means the number of zero-crossing points. The zero-crossing point is a point at which a signal value of the frame crosses zero. For example, when signal value 1 at a certain time is negative and signal value 2 at the next time is changed to a positive value, the zero-crossing point is a point at which a signal value in the line segment connecting signal values 1 and 2 is zero. When signal value 3 at a certain time is positive and signal value 4 at the next time is changed to a negative value, the zero-crossing point is a point at which a signal value in the line segment connecting signal values 3 and 4 is zero.

The speech section detection unit 108 determines that a frame is in a speech section when the counted number of zero crossings is greater than a predetermined threshold of the number of zero-crossings (for example, 15 when the frame length is 32 ms), and determines that the frame is in a non-speech section otherwise. The non-speech section includes a soundless section.

Figure 7:
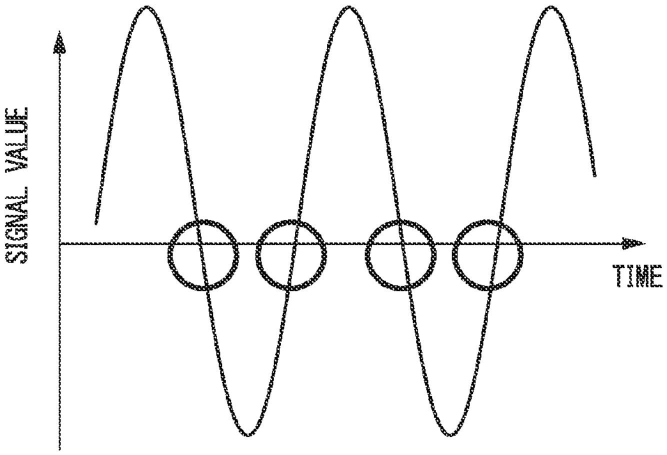
FIG. 7 is a conceptual diagram illustrating an example of a zero-crossing point.

FIG. 7 is a conceptual diagram illustrating an example of zero-crossing points.

In FIG. 7, the horizontal axis represents the time and the vertical axis represents the signal value of the second noise-removed signal x"(t). In FIG. 7, the units or scales of the time and the signal value are not illustrated.

In FIG. 7, the curve whose amplitude periodically varies with the variation of time indicates the signal value of the second noise-removed signal x"(t) at the times. In FIG. 7, points at which the signal value is changed from a positive value to a negative value and points at which the signal value is changed from a negative value to a positive value are surrounded with circles. Four points surrounded with circles are zero-crossing points.

An example of speech section detection information created by the speech section detection unit 108 will be described below.

Figure 8:
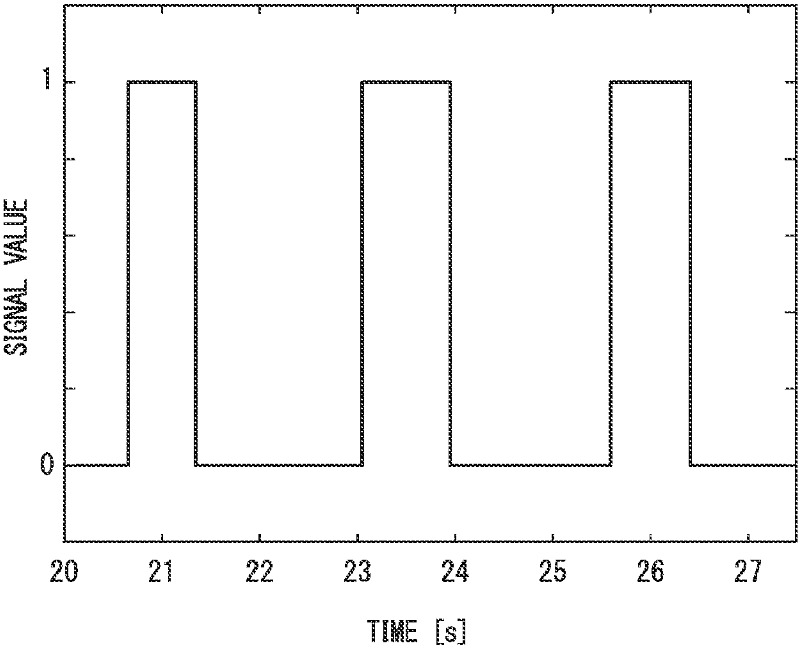
FIG. 8 is a diagram illustrating an example of speech section detection information.

FIG. 8 is a diagram illustrating an example of the speech section detection information.

In FIG. 8, the horizontal axis represents the time and the vertical axis represents the signal value constituting the speech section detection information.

In the example illustrated in FIG. 8, the signal value in the time sections of 20.7 to 21.3 sec, 23.0 to 24.0 sec, and 25.7 to 26.4 sec is 1 and the signal value in the other sections is 0. That is, the speech section detection information represents that the frames in the time sections of 20.7 to 21.3 sec, 23.0 to 24.0 sec, and 25.7 to 26.4 sec are in a speech section and the frames in the other time sections are in a non-speech section.

An example of a speech section signal z(t) extracted by the speech section extraction unit 109 will be described below.

Figure 9:
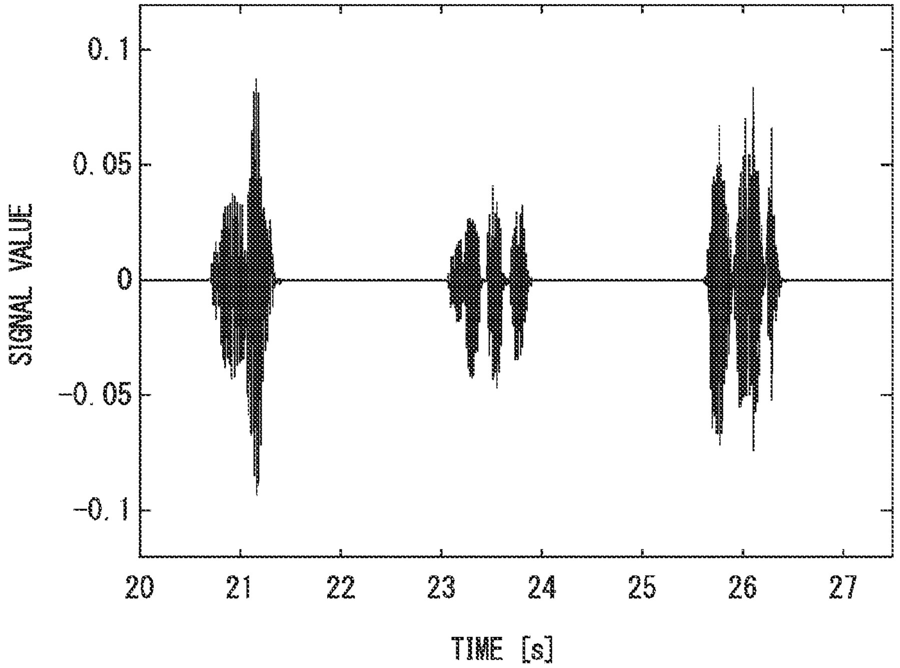
FIG. 9 is a diagram illustrating an example of a speech-section signal.

FIG. 9 is a diagram illustrating an example of a speech section signal.

In FIG. 9, the horizontal axis represents the time and the vertical axis represents the signal value of the speech section signal z(t). The time range represented by the horizontal axis in FIG. 9 is equal to the ranges represented by the horizontal axes in FIGS. 6 and 8. In the example illustrated in FIG. 9, the signal value of the first noise-removed signal x'(t) appears in the time sections of 20.7 to 21.3 sec, 23.0 to 24.0 sec, and 25.7 to 26.4 sec. The amplitude in the other time sections is 0. This shows that the speech sections illustrated in FIG. 8 of the first noise-removed signal x'(t) are extracted as the speech section signal z(t). The speech recognition unit 110 performs a speech recognizing process on the extracted speech section signal z(t).

A sound processing flow according to this embodiment will be described below.

Figure 10:
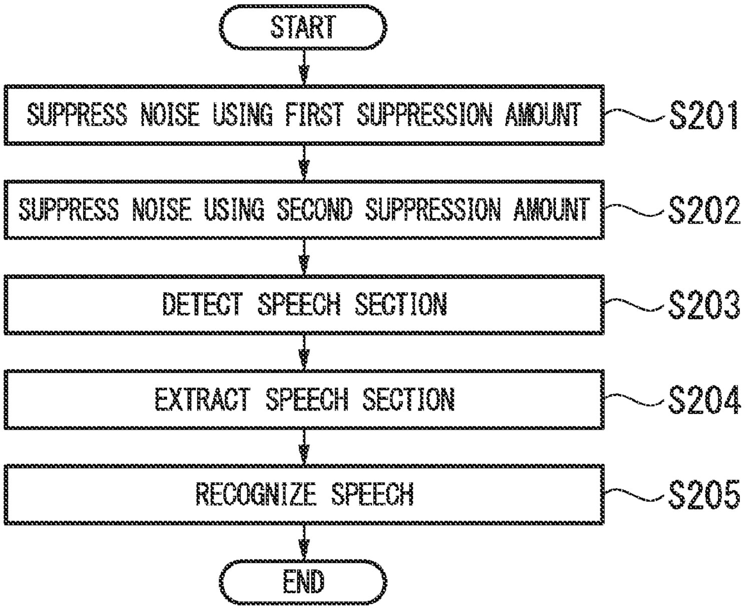
FIG. 10 is a flowchart illustrating a sound processing flow according to the first embodiment.

FIG. 10 is a flowchart illustrating a sound processing flow according to this embodiment.

(Step S201) The noise suppression unit 103-1 estimates a noise power X(k, l) as a noise component included in the power spectrum $|Y(k, l)|^2$ based on a sound signal y(t) using a first suppression amount, for example, using the HRLE method. The noise suppression unit 103-1 calculates a complex noise-removed spectrum X'(k, l) whose noise component is suppressed using the first suppression amount by subtracting the estimated noise power λ(k, l) from the power spectrum $|Y(k, l)|^2$. Thereafter, the process proceeds to step S202.

(Step S202) The noise suppression unit 103-2 estimates a noise power λ(k, l) included in the power spectrum $|Y(k, l)|^2$ using a second suppression amount greater than the first suppression amount. When the HRLE method is used, the cumulative frequency Lx in the noise suppression unit 103-2 is greater than the cumulative frequency Lx in the noise suppression unit 103-1. The noise suppression unit 103-2 calculates a complex noise-removed spectrum X"(k, l) whose noise component is suppressed using the second suppression amount by subtracting the estimated noise power X(k, l) from the power spectrum $|Y(k, l)|^2$. Thereafter, the process proceeds to step S203.

(Step S203) The speech section detection unit 108 detects whether the second noise-removed signal x"(t) based on the complex noise-removed spectrum X"(k, l) is in a speech section for each frame. Here, the speech section detection unit 108 determines whether each frame is in a sounding section or in a soundless section based on the intensities of the signal values of the second noise-removed signal x"(t). The speech section detection unit 108 counts the number of zero crossings for each frame determined to be in a sounding section and determines whether the frame is in a speech section based on the counted number of zero crossings. The speech section detection unit 108 creates speech section detection information indicating whether the frame is in a speech section or in a non-speech section. Thereafter, the process proceeds to step S204.

(Step S204) The speech section extraction unit 109 extracts a signal of a frame indicated to be in a speech section by the speech section detection information as the speech section signal z(t) from the first noise-removed signal x'(t). Thereafter, the process proceeds to step S204.

(Step S205) The speech recognition unit 110 recognizes speech details by performing a speech recognizing process on the speech section signal z(t). Thereafter, the process flow ends.

The case in which the time domain transformation unit 107-1 outputs the first noise-removed signal x'(t) without any change to the speech section extraction unit 109 is described above as an example, but this embodiment is not limited to this example. In this embodiment, auxiliary noise such as white noise or pink noise may be added to the first noise-removed signal x'(t) output from the time domain transformation unit 107-1 by a predetermined addition amount. The speech section extraction unit 109 may extract a signal of a frame in which the sound signal having the auxiliary noise added thereto is determined to be in a speech section as the speech section signal z(t). Accordingly, since distortion generated by suppressing the noise component is alleviated, it is possible to improve the speech recognition rate.

As described above, in this embodiment, the noise component included in the input sound signal is suppressed using the first suppression amount and the noise component included in the input sound signal is suppressed using the second suppression amount greater than the first suppression amount. In this embodiment, it is detected for every predetermined time whether the sound signal whose noise component has been suppressed using the second suppression amount includes a speech section including a speech, and the speech recognizing process is performed on the section of the sound signal whose noise component has been suppressed using the first suppression amount and which is detected to be a speech section.

The greater the suppression amount of the noise component is, the more the noise component is removed and the more accurately the speech component is extracted than the speech component having noise superimposed thereon. Accordingly, the speech recognition rate is more improved than that of a sound signal whose noise component is not removed. On the other hand, the greater the suppression amount is, the more remarkable distortion of the extracted speech component is and thus the lower the speech recognition rate may be. However, the intensity and the number of zero crossings as a key to determining whether a section is a speech section has low dependency on distortion and thus is robust thereto, but has high dependency on the noise component.

Therefore, in this embodiment, it is possible to accurately determine a speech section based on a noise-removed signal whose noise component has been suppressed using a greater suppression amount and it is thus possible to improve the speech recognition rate using a sound signal with small distortion whose noise component has been suppressed using a smaller suppression amount.

In this embodiment, processes with high calculation cost such as estimating sound source directions of sounds signals of multiple channels and separating the sound signals of multiple channels into sound signals by sound sources may not be performed. Accordingly, it is possible to cause reduction of the calculation cost and improvement of the speech recognition rate to be compatible with each other.

Second Embodiment

A second embodiment of the invention will be described below with the same elements as in the above-mentioned embodiment referenced by the same reference signs.

Figure 11:
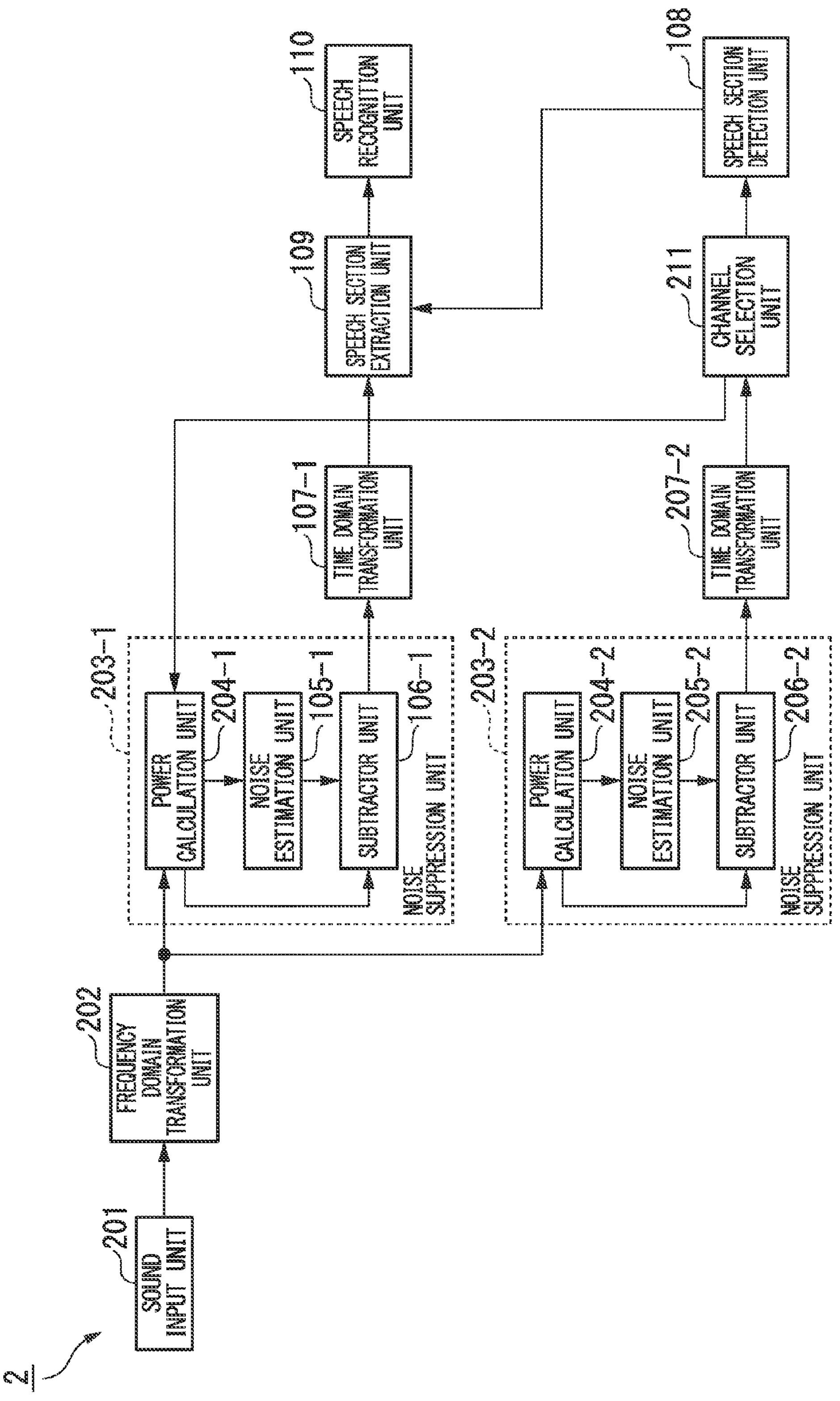
FIG. 11 is a block diagram schematically illustrating a configuration of a sound processing device according to a second embodiment of the invention.

FIG. 11 is a block diagram schematically illustrating a configuration of a sound processing device 2 according to this embodiment.

The sound processing device 2 includes a sound input unit 201, a frequency domain transformation unit 202, two noise suppression units 203-1 and 203-2, two time domain transformation units 107-1 and 207-2, a speech section detection unit 108, a speech section extraction unit 109, a speech recognition unit 110, and a channel selection unit 211. That is, the sound processing device 2 includes the sound input unit 201, the noise suppression units 203-1 and 203-2, and the time domain transformation unit 207-2 instead of the sound input unit 101, the noise suppression units 103-1 and 103-2, and the time domain transformation unit 107-2 in the sound processing device 1 (FIG. 1), and further includes the channel selection unit 211.

The sound input unit 201 generates sound signals of N channels (where N is an integer equal to or greater than 2)

based on arriving sound waves and outputs the generated sound signals of N channels to the frequency domain transformation unit 202. For example, the sound input unit 201 is a microphone array including N microphones which are arranged at different positions and which convert sound waves into sound signals.

The frequency domain transformation unit 202 transforms the sound signals y(t) of N channels input from the sound input unit 201 to complex input spectrums Y(k, l) expressed in the frequency domain by performing the same process as the frequency domain transformation unit 102 thereon.

The frequency domain transformation unit 202 outputs the transformed complex input spectrums Y(k, l) of N channels to the two noise suppression units 203-1 and 203-2.

The noise suppression unit 203-1 suppresses the noise component of the channel indicated by a channel selection signal input from the channel selection unit 211 out of the complex input spectrums Y(k, l) of N channels input from the frequency domain transformation unit 202 using a first suppression amount. The process of causing the noise suppression unit 203-1 to suppress the noise component may be the same as the process of causing the noise suppression unit 103-1 to suppress the noise component. The noise suppression unit 203-1 outputs the complex noise-removed spectrums X'(k, l) whose noise component has been suppressed to the time domain transformation unit 107-1.

Here, the noise suppression unit 203-1 includes a power calculation unit 204-1, a noise estimation unit 105-1, and a subtractor unit 106-1.

The complex input spectrums Y(k, l) of N channels from the frequency domain transformation unit 202 and the channel selection signal from the channel selection unit 211 are input to the power calculation unit 204-1. The channel selection signal will be described later. The power calculation unit 204-1 calculates a power spectrum $|Y(k, l)|^2$ of the complex input spectrum Y(k, l) of the channel indicated by the channel selection signal out of the complex input spectrums Y(k, l) of N channels. The power calculation unit 104-1 outputs the calculated power spectrum $|Y(k, l)|^2$ to the noise estimation unit 105-1 and the subtractor unit 106-1.

The noise suppression unit 203-2 suppresses the noise components included in the complex input spectrums Y(k, l) of N channels input from the frequency domain transformation unit 202 using a second suppression amount for each channel. The process of causing the noise suppression unit 203-1 to suppress the noise components may be the same as the process of causing the noise suppression unit 103-1 to suppress the noise component. The noise suppression unit 203-2 outputs the complex noise-removed spectrums X"(k, l) of N channels whose noise component has been suppressed to the time domain transformation unit 207-2.

Here, the noise suppression unit 203-2 includes a power calculation unit 204-2, a noise estimation unit 205-2, and a subtractor unit 206-2.

The complex input spectrums Y(k, l) of N channels from the frequency domain transformation unit 202 are input to the power calculation unit 204-2, which calculates the power spectrum $|Y(k, l)|^2$ for each channel. The power calculation unit 204-2 outputs the calculated power spectrums $|Y(k, l)|^2$ of N channels to the noise estimation unit 205-2 and the subtractor unit 206-2.

The noise estimation unit 205-2 calculates the power spectrum X(k, l) of the noise component included in the power spectrums $|Y(k, l)|^2$ of N channels input from the power calculation unit 204-2 for each channel. The noise estimation unit 205-2 outputs the calculated noise powers X(k, l) of N channels to the subtractor unit 206-2.

The subtractor unit 206-2 calculates a complex noise-removed spectrum X"(k, l) by subtracting the noise powers λ(k, l) of the corresponding channels from the power spectrums $|Y(k, l)|^2$ of N channels input from the power calculation unit 204-2. The process of causing the subtractor unit 206-2 to subtract the noise power λ(k, l) may be the same as the process of causing the subtractor unit 106-1 to subtract the noise power λ(k, l).

The subtractor unit 206-2 outputs the calculated complex noise-removed spectrum X"(k, l) of N channels to the time domain transformation unit 207-2.

The time domain transformation unit 207-2 transforms the complex noise-removed spectrums X"(k, l) of N channels input from the subtractor unit 206-2 to second noise-removed signals x"(t) in the time domain for each channel. The process of causing the time domain transformation unit 207-2 to transform the complex noise-removed spectrum to the second noise-removed signal x"(t) may be the same as the process of causing the time domain transformation unit 107-2 to transform the complex noise-removed spectrum to the second noise-removed signal x"(t). The time domain transformation unit 207-2 outputs the transformed second noise-removed signals x"(t) of N channels to the channel selection unit 211.

The channel selection unit 211 calculates the intensities of the second noise-removed signals x"(t) of N channels input from the time domain transformation unit 207-2. The channel selection unit 211 may use the average value of absolute values of signal values (amplitudes) for each section with a predetermined length as the intensity, or may use power which is the total sum of square values of the signal values in a frame. The section with a predetermined length may be a time interval of one frame and may be a time interval of a predetermined integer number of frames greater than 1. The channel selection unit 211 selects a channel in which the calculated intensity is the largest out of the N channels. The channel selection unit 211 outputs the channel selection signal indicating the selected channel to the power calculation unit 204-1 and outputs the second noise-removed signal x"(t) of the selected channel to the speech section detection unit 108.

A sound processing flow according to this embodiment will be described below.

Figure 12:
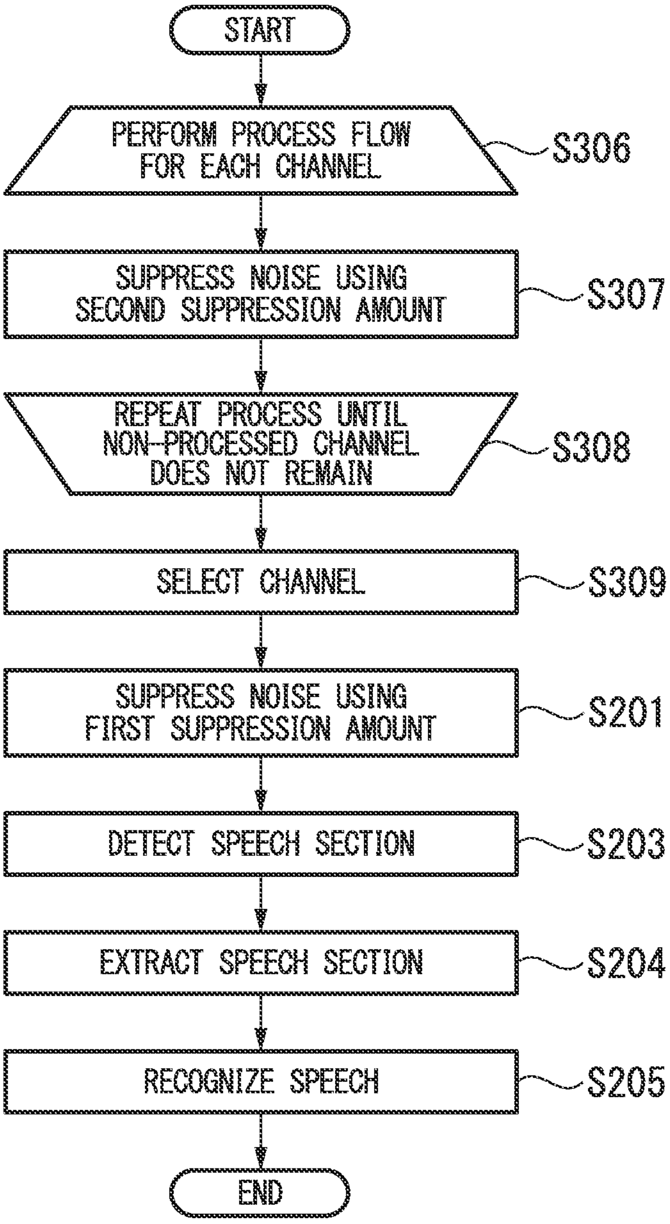
FIG. 12 is a flowchart illustrating a sound processing flow according to the second embodiment.

FIG. 12 is a flowchart illustrating the sound processing flow according to this embodiment.

The sound processing flow according to this embodiment is a process flow in which step S202 is removed from the sound processing flow illustrated in FIG. 10 and which further includes steps S306 to S309. Steps S306 to S309 are performed before step S201 is performed. In the sound processing flow illustrated in FIG. 12, step S203 is performed after step S201 is performed.

(Step S306) The noise suppression unit 203-2 performs the process of step S307 for each channel of N channels of the sound signals y(t).

(Step S307) The noise suppression unit 203-2 estimates a noise component using the noise power X(k, l) which is a noise component included in the power spectrum $|Y(k, l)|^2$ based on the sound signal y(t) as the second suppression amount. The noise suppression unit 203-2 calculates a complex noise-removed spectrums X"(k, l) whose noise component is suppressed using the second suppression amount by subtracting the estimated noise power X(k, l) from the power spectrum $|Y(k, l)|^2$. Thereafter, the process proceeds to step S308.

(Step S308) The process of step S307 is repeatedly performed while changing the channel to be processed until a non-processed channel disappears. When the non-processed channel disappears, the process proceeds to step S309.

(Step S309) The channel selection unit 211 calculates the intensity of each channel of the second noise removed signal x"(t) based on the complex noise-removed spectrums X"(k, l) of N channels. The channel selection unit 211 selects a channel in which the calculated intensity is the largest out of N channels.

Thereafter, the processes of steps S201 and S203 to S205 are performed on the selected channel.

In this embodiment, the noise suppression unit 103-1 may calculate the complex noise-removed spectrums X'(k, l) whose noise component has been suppressed using the noise power λ(k, l), which is the noise component included in the power spectrum $|Y(k, l)|^2$ of each of N channels, as the first suppression amount. The channel selection unit 211 may calculate the intensities of the first noise-removed signals x'(t) based on the complex noise-removed spectrums X'(k, l) of N channels and may select a channel in which the calculated intensity is the largest out of N channels. The speech section extraction unit 109 may extract a signal of a frame, which is indicated to be in a speech section by the speech section detection information input from the speech section detection unit 108, as the speech section signal z(t) from the first noise-removed signal x'(t) of the selected channel. In this case, the noise suppression unit 203-2 estimates the noise component using the noise power λ(k, l), which is the noise component included in the power spectrum $|Y(k, l)|^2$ based on the sound signal y(t), as the second suppression amount. The noise suppression unit 203-2 may calculate the complex noise-removed spectrums X"(k, l) whose noise component has been suppressed using the second suppression amount by subtracting the estimated noise power X(k, l) from the power spectrum $|Y(k, l)|^2$ of the selected channel.

As described above, in this embodiment, the noise component of each of at least two channels is suppressed using one of the first suppression amount and the second suppression amount and it is determined whether the sound signal in which the intensity of the sound signal whose noise component has been suppressed using the one of the first suppression amount and the second suppression amount is the largest is in a speech section. In this embodiment, the speech recognizing process is performed on a section of the sound signal of the channel, whose noise component has been suppressed using the first suppression amount and which is detected to be in a speech section.

Accordingly, since the processes related to speech section detection or speech recognition are performed on the channel including a speech component having the largest intensity, it is possible to further reduce the influence of the noise component and thus to improve the speech recognition rate.

Third Embodiment

A third embodiment of the invention will be described below with the same elements as in the above-mentioned embodiments referenced by the same reference signs.

Figure 13:
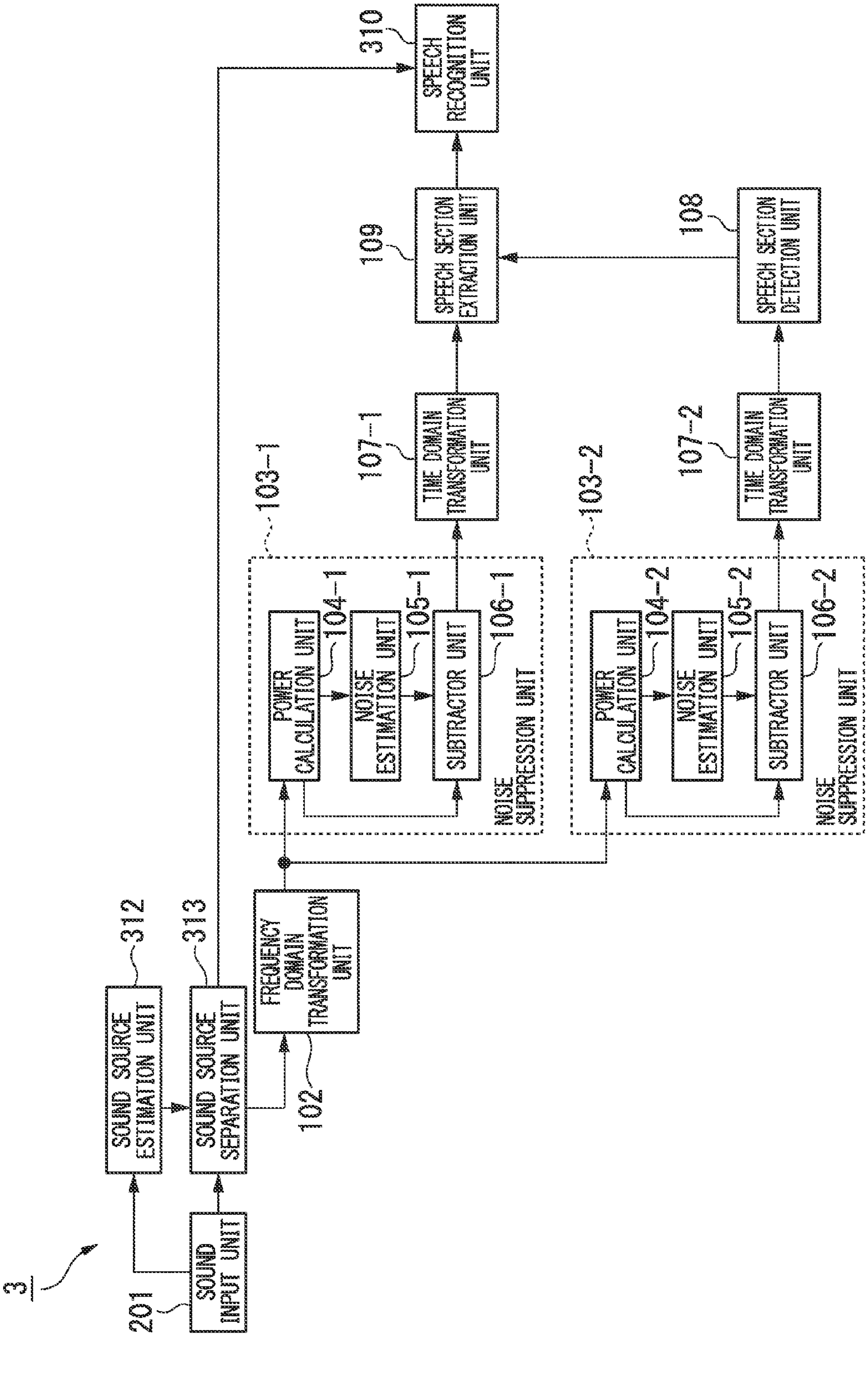
FIG. 13 is a block diagram schematically illustrating a configuration of a sound processing device according to a third embodiment of the invention.

FIG. 13 is a block diagram schematically illustrating a configuration of a sound processing device 3 according to this embodiment.

The sound processing device 3 includes a sound input unit 201, a frequency domain transformation unit 102, two noise suppression units 103-1 and 103-2, two time domain transformation units 107-1 and 107-2, a speech section detection unit 108, a speech section extraction unit 109, a speech recognition unit 310, a sound source estimation unit 312, and a sound source separation unit 313.

That is, the sound processing device 3 includes the sound input unit 201 and the speech recognition unit 310 instead of the sound input unit 101 and the speech recognition unit 110 in the sound processing device 1 (FIG. 1), and further includes the sound source estimation unit 312 and the sound source separation unit 313.

The sound source estimation unit 312 estimates sound source directions and the number of sound sources of sound signals y(t) of N channels input from the sound input unit 201. The sound source estimation unit 312 transforms the sound signals y(t) in the time domain to complex spectrums Y(k, l) in the frequency domain for each frame l. The sound source estimation unit 312 calculates a correlation matrix R(k, l) for each frame l based on the transformed complex spectrums Y(k, l). The correlation matrix R(k, l) is a matrix having an inter-channel correlation between an input signal of channel m (where m is an integer of 1 to N) and an input signal of channel n (where n is an integer of 1 to N) as an element value of row m and column n. Accordingly, the correlation matrix R(k, l) is a square matrix of N rows and N columns. The sound source estimation unit 312 may calculate the correlation matrix R(k, l) by accumulating (moving average) the inter-channel correlation over a section with a predetermined length until the current frame.

The sound source estimation unit 312 performs eigenvalue expansion on the calculated correlation matrix R(k, l) using a known calculation method (for example, QR method), and calculates N eigenvalues $\lambda_1, \ldots, \lambda_N$ and eigenvectors $e_1(k, l), \ldots, e_N(k, l)$ corresponding to the eigenvalues $\lambda_1, \ldots, \lambda_N$ for each frame l. The order 1, . . . , N of the eigenvalues $\lambda_1, \ldots, \lambda_N$ is a descending order of magnitudes thereof.

The sound source estimation unit 312 includes a storage unit (not illustrated) in which a transfer function vector G(k, ϕ)) is stored in advance for each frequency k and each direction ϕ. The transfer function vector G(k, ϕ)) is a vector of N columns having a transfer function from a sound source in the direction ϕ to the microphones (channels) of the sound input unit 201 as an element value. The transfer function vector G(k, ϕ)) is also referred to as a steering vector.

The sound source estimation unit 312 calculates a spatial spectrum P(k, ϕ, l) for each frame l based on N eigenvectors $e_1(k, l), \ldots, e_N(k, l)$ for each frequency k and each direction ϕ and the read transfer function vectors G(k, ϕ). The sound source estimation unit 312 uses, for example, Expression (8) to calculate the spatial spectrum P(k, ϕ, l).

$$P(k, \psi, l) = \frac{|G^*(k, \psi)G(k, \psi)|}{\sum_{n=L+1}^{N} |G^*(k, \psi)e_n(k, l)|} \tag{8}$$

In Expression (8), L represents the number of target sound sources. The number of target sound sources is the maximum number of sound sources of which the sound source directions should be detected as a target sound. L is a predetermined integer greater than 0 and smaller than N. Here, * is an operator representing a complex conjugate of a vector or a matrix. That is, Expression (8) represents that the spatial spectrum P(k, ϕ, l) is calculated by dividing the norm of the transfer function vector G(k, ϕ) by the total sum of inner products of the transfer function vector G(k, ϕ) and N-L eigenvectors $e_{L+1}(k, l), \ldots, e_N(k, l)$. Ideally, the directions of the N-L eigenvectors $e_{L+1}(k, l), \ldots, e_N(k, l)$ are orthogonal to the transfer function vectors G(k, ϕ) in the maximum L sound source directions ϕ, respectively. Accordingly, the spatial spectrum P(k, ϕ, l) for each of the L sound source directions ϕ has a value greater than the spatial spectrums P(k, ϕ, l) in the other directions.

The sound source estimation unit 312 calculates an averaged spatial spectrum <P(ϕ, l)> for each frame l and each direction ϕ by averaging the calculated spatial spectrums P(k, ϕ, l) over a predetermined frequency band. The sound source estimation unit 312 uses, for example, Expression (9) to calculate the averaged spatial spectrum <P(ϕ, l)>.

$$\langle P(\psi, l)\rangle = \frac{1}{k_H - k_L + 1}\sum_{k=k_L}^{k_H} P(k, \psi, l) \quad (9)$$

In Expression (9), $k_H$ represents an index of an upper limit of the frequency (upper-limit frequency) in the above-mentioned frequency band, and $k_L$ represents an index of a lower limit of the frequency (lower-limit frequency) in the frequency band. The upper-limit frequency is, for example, 3.5 kHz and the lower-limit frequency is, for example, 0.5 kHz. The denominator $k_H - k_{L+1}$ of the right side of Expression (9) represents the number of spatial spectrums P(k, ϕ, l) to be added.

The sound source estimation unit 312 determines the direction ϕ based on the calculated averaged spatial spectrum <P(ϕ, l)>. Here, the sound source estimation unit 312 selects a direction ϕ in which the averaged spatial spectrum <P(ϕ, l)> has a maximum value as the sound source direction ϕ in which the averaged spatial spectrum <P(ϕ, l)> is greater than a predetermined threshold value. The sound source estimation unit 312 determines the selected direction ϕ and the sound source direction and counts the determined sound source as the number of sound sources. When the counted number of sound sources is greater than L, the sound source estimation unit 312 selects the directions from a direction ϕ in which the averaged spatial spectrum <P(ϕ, l)> is the largest to a direction ϕ in which the averaged spatial spectrum <P(ϕ, l)> is the L-th largest. In this case, the sound source estimation unit 312 determines the number of sound sources to be L.

The sound source estimation unit 312 outputs sound source direction information indicating the sound source directions of the selected sound sources and the number of selected sound sources to the sound source separation unit 313.

The sound source separation unit 313 determines whether the number of sound sources indicated by the sound source direction information input from the sound source estimation unit 312 is greater than 1.

When it is determined that the number of sound sources is greater than 1, the sound source separation unit 313 separates the sound signals of N channels input from the sound input unit 201 into sound signals of the sound sources based on the sound source directions of the sound sources indicated by the sound source direction information. Here, the sound source separation unit 313 calculates a spatial filter coefficient in which the directivity in the sound direction of each sound source indicated by the sound source direction information is the highest for each channel, for example, based on the arrangement of the microphones corresponding to the channels in the sound input unit 201. The sound source separation unit 313 performs a convolution operation of the calculated spatial filter coefficients on the sound signals of N channels to generate a sound signal of the corresponding sound source. The sound source separation unit 313 is not limited to the above-mentioned method, and may employ any method as long as it can generate a sound signal of a corresponding sound source based on the sound source directions and the arrangement of the microphones of the channels. For example, the sound source separation unit 313 may use a sound source separating method described in Japanese Unexamined Patent Application, First Publication No. 2012-42953.

The sound source separation unit 313 outputs the separated sound signal for each sound source to the speech recognition unit 310.

When it is determined that the number of sound sources is 1 or 0, the sound source separation unit 313 outputs a sound signal of at least a certain channel out of the sound signals of N channels input from the sound input unit 201 to the frequency domain transformation unit 102. The sound source separation unit 313 may select a channel having the largest intensity out of the sound signals of N channels and may output the sound signal of the selected channel to the frequency domain transformation unit 102.

The speech recognition unit 310 performs a speech recognizing process on a speech section signal z(t), similarly to the speech recognition unit 110, when the speech section signal z(t) is input from the speech section extraction unit 109, that is, when it is determined that the number of sound sources is 1 or 0.

The speech recognition unit 310 performs the speech recognizing process on the input sound signals of channels when the sound signals by sound sources are input from the sound source separation unit 313, that is, when it is determined that the number of sound sources is greater than 1.

A sound processing flow according to this embodiment will be described below.

Figure 14:
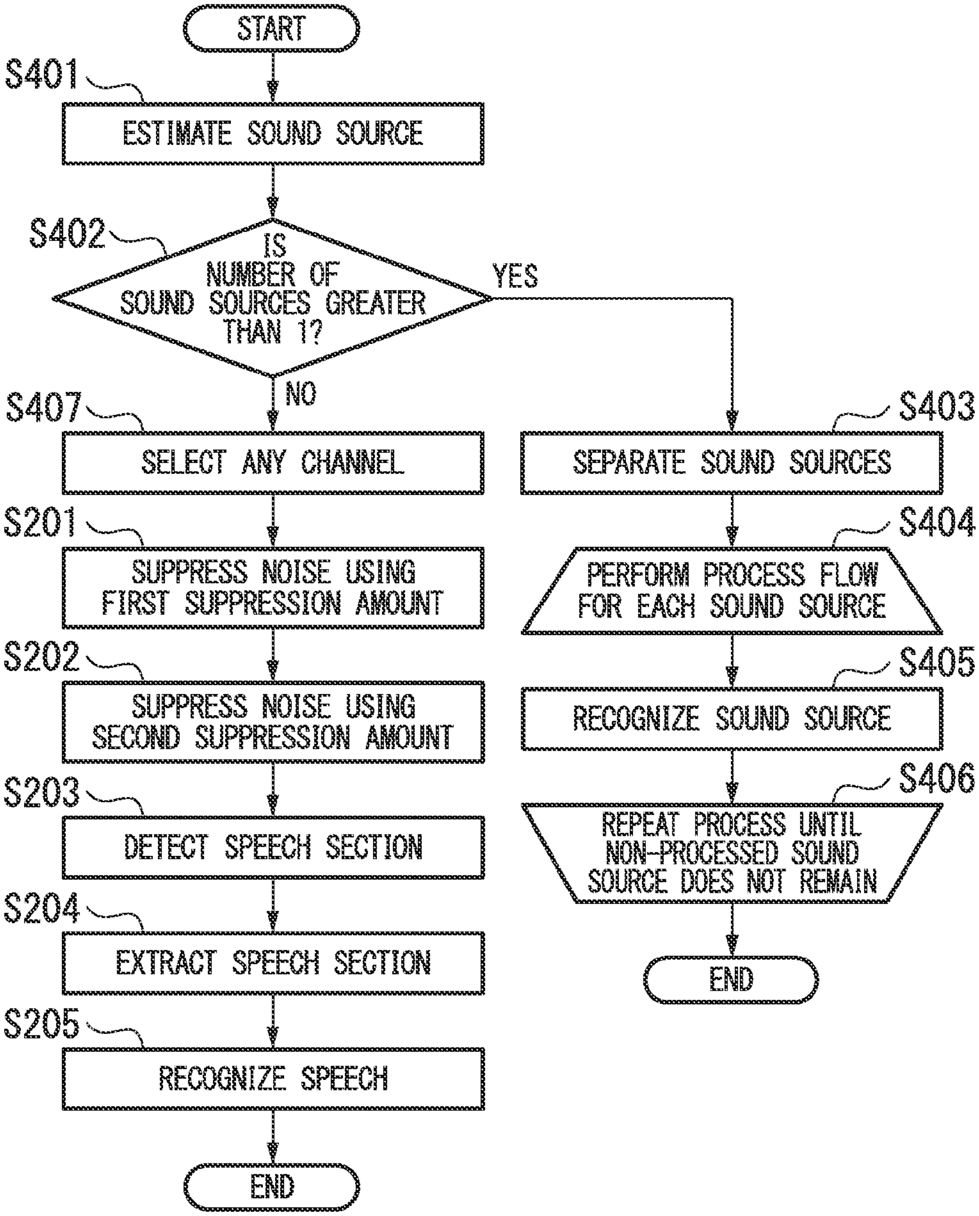
FIG. 14 is a flowchart illustrating a sound processing flow according to the third embodiment.

FIG. 14 is a flowchart illustrating the sound processing flow according to this embodiment.

(Step S401) The sound source estimation unit 312 calculates the correlation matrix R(k, l) of the sound signals y(t) of N channels in the time domain for each frame l. The sound source estimation unit 312 calculates the spatial spectrum P(k, ϕ, l) based on the eigenvectors $e_1, \ldots, e_N$ of the calculated correlation matrix R(k, l) and the transfer function vector G(k, ϕ). The sound source estimation unit 312 calculates the averaged spatial spectrum <P(ϕ, l)> for each frame l and each sound source direction ϕ by averaging the calculated spatial spectrums P(k, ϕ, l) over a predetermined frequency band. The sound source estimation unit 312 determines a direction ϕ in which the calculated averaged spatial spectrum <P(ϕ, l)> has a maximum value as a sound source direction and estimates the number of sound sources by counting the determined sound source. Thereafter, the process proceeds to step S402.

(Step S402) The sound source separation unit 313 determines whether the number of sound sources estimated by the sound source estimation unit 312 is greater than 1. When it is determined that the number of sound sources is greater than 1 (YES in step S402), the process proceeds to step S403. When it is determined that the number of sound sources is 1 or 0 (NO in step S402), the process proceeds to step S407.

(Step S403) The sound source separation unit 313 separates the sound signals of N channels into sound signals by sound sources based on the estimated sound source directions by sound sources. Thereafter, the process proceeds to step S404.

(Step S404) The speech recognition unit 310 performs the process of step S405 on each estimated sound source.

(Step S405) The speech recognition unit 310 performs the speech recognizing process on the sound signals by sound sources input from the sound source separation unit 313. Thereafter, the process proceeds to step S406.

(Step S406) The process of step S405 is repeatedly performed while changing the sound source to be processed to a non-processed sound source until the non-processed sound source disappears. When the non-processed sound source does not remain, the process flow ends.

(Step S407) The sound source separation unit 313 selects a sound signal of a channel out of the sound signals of N channels and outputs the selected sound signal of the channel to the frequency domain transformation unit 102. Thereafter, the process proceeds to step S201. The processes of steps S201 to S205 are performed on the selected sound signal of the channel.

The sound source estimation unit 312 may perform eigenvalue expansion of a matrix, which is obtained by dividing the correlation matrix R(k, l) by a predetermined noise correlation matrix K(k, l), instead of the correlation matrix R(k, l). The noise correlation matrix is a matrix having an inter-channel correlation of the sound signals indicating noise as an element value. Accordingly, it is possible to reduce the influence of the noise component and thus to improve the speech recognition rate.

The sound processing flow described with reference to FIG. 12 may be performed on the sound signals by sound sources separated by the sound source separation unit 313. Accordingly, even when a noise component is included in separated sound signals, the noise component is suppressed and the speech recognizing process is performed. As a result, it is possible to improve the speech recognition rate.

As described above, in this embodiment, the number of sound sources of sound signals of at least two channels and the directions by sound sources are estimated, and the sound signals of at least two channels are separated into the sound signals by sound sources based on the directions by sound sources when the estimated number of sound sources is at least two.

In this embodiment, the speech recognizing process is performed on the separated sound signals by sound sources.

That is, when the estimated number of sound sources is at least two, the sound signals by sound sources are separated and the speech recognizing process is performed on the separated sound signals. When sounds are less often uttered simultaneously from multiple sound sources such as conversations, the opportunity to perform a process with a large processing load such as a process of separating sound signals by sound sources is restricted. Accordingly, it is possible to improve the speech recognition rate in recognizing speeches from multiple sound sources and to suppress the processing load of a system as a whole.

Parts of the sound processing device 1, 2, and 3 in the above-mentioned embodiments, for example, the frequency domain transformation units 102 and 202, the noise suppression units 103-1, 103-2, 203-1, and 203-2, the time domain transformation units 107-1, 107-2, and 207-2, the speech section detection unit 108, the speech section extraction unit 109, the speech recognition units 110 and 310, the channel selection unit 211, the sound source estimation unit 312, and the sound source separation unit 313, may be embodied by a computer. In this case, the parts of the sound processing device may be embodied by recording a program for performing the control function on a computer-readable recording medium and reading and executing the program recorded on the recording medium into a computer system. Here, the “computer system” is a computer system built in the sound processing devices 1, 2, and 3 and is assumed to include an OS or hardware such as peripherals. Examples of the “computer-readable recording medium” include portable mediums such as a flexible disk, a magneto-optical disk, a ROM, and a CD-ROM and a storage device such as a hard disk built in a computer system. The “computer-readable recording medium” may include a medium that dynamically holds a program for a short time like a communication line when a program is transmitted via a network such as the Internet or a communication circuit such as a telephone circuit or a medium that holds a program for a predetermined time like a volatile memory in a computer system serving as a server or a client in that case. The program may be configured to realize a part of the above-mentioned functions or may be configured to realize the above-mentioned functions by combination with a program recorded in advance in a computer system.

All or part of the sound processing devices 1, 2, and 3 according to the above-mentioned embodiments may be embodied by an integrated circuit such as a large scale integration (LSI) circuit. The functional blocks of the sound processing devices 1, 2, and 3 may be individually incorporated into processors, or a part or all thereof may be integrated and incorporated into a processor. The integration circuit technique is not limited to the LSI, but may be embodied by a dedicated circuit or a general-purpose processor. When an integration circuit technique appears as a substituent of the LSI with advancement in semiconductor technology, an integrated circuit based on the technique may be used.

While exemplary embodiments of the invention have been described above in detail with reference to the accompanying drawings, the specific configurations are not limited to the above-mentioned configurations but can be modified in design in various forms without departing from the gist of the invention.

What is claimed is:

1. A sound processing device comprising:

a processor configured to:

suppress a noise component included in an input sound signal using a first suppression amount;

suppress the noise component included in the input sound signal using a second suppression amount greater than the first suppression amount;

detect whether the sound signal whose noise component has been suppressed by the second suppression amount includes a speech section having a speech for every predetermined time;

perform a speech recognizing process on a section, which is detected to be a speech section having a speech, in the sound signal whose noise component has been suppressed by the first suppression amount;

input sound signals of at least two channels;

estimate the number of sound sources of the sound signals of the inputted at least two channels and directions of the sound sources; and separate the sound signals of the at least two channels into sound signals of the sound sources based on the directions of the sound sources when the estimated number of sound sources is at least two, wherein the processor is configured to perform the speech recognizing process on the separated sound signals of the sound sources.

2. The sound processing device according to claim 1, wherein the processor is configured to suppress the noise component of the at least two channels by one of the first suppression amount and the second suppression amount, and the processor is further configured to:

detect whether the sound signal of the maximum intensity channel, which is a channel in which the intensity of the sound signal whose noise component has been suppressed by the one suppression amount is the larger out of the at least two channels, includes a speech section, and perform a speech recognizing process on the section, which is detected to be a speech section having a speech, in the sound signal of the maximum intensity channel whose noise component has been suppressed by the first suppression amount.

3. The sound processing device according to claim 1, wherein the processor is configured to calculate the intensity and the zero-crossing number of the sound signal whose noise component has been suppressed by the second suppression amount and to detect whether the sound signal includes a speech section based on the calculated intensity and the calculated zero-crossing number.

4. A sound processing method comprising:

using a processor for:

suppressing a noise component included in an input sound signal using a first suppression amount;

suppressing the noise component included in the input sound signal using a second suppression amount greater than the first suppression amount;

detecting whether the sound signal whose noise component has been suppressed by the second suppression amount includes a speech section having a speech for every predetermined time;

performing a speech recognizing process on a section, which is detected to be a speech section having a speech, in the sound signal whose noise component has been suppressed by the first suppression amount;

inputting sound signals of at least two channels;

estimating the number of sound sources of the sound signals of the inputted at least two channels and directions of the sound sources; and separating the sound signals of the at least two channels into sound signals of the sound sources based on the directions of the sound sources when the estimated number of sound sources is at least two, wherein the processor is configured to perform the speech recognizing process on the separated sound signals of the sound sources.

* * * * *